Dec. 19, 1972   B. D. HUBER ET AL   3,706,824
SYSTEM FOR HEATING A SECTION OF PIPE
Filed Feb. 22, 1971

INVENTOR.
BUEL D. HUBER
HOWARD M. ENLOE
BY Brown & Martin
ATTORNEYS

3,706,824
SYSTEM FOR HEATING A SECTION OF PIPE
Buel D. Huber, 11848 Altadena, Lakeside, Calif. 92040, and Howard M. Enloe, 509 Hemerick, Huston, Mo. 65483
Filed Feb. 22, 1971, Ser. No. 117,286
Int. Cl. F27b 17/00
U.S. Cl. 263—2 R  9 Claims

ABSTRACT OF THE DISCLOSURE

A system for heating a section of pipe sufficiently to allow bending of the pipe for making curves and right angle bends for installation. The heater has a body portion including an elongated heating chamber with openings at each end for receiving a section of plastic or other heat pliable pipe, and a gas injection section for receiving but diffusing the heated exhaust gas of an internal combustion engine. A supplemental device is utilized for heating the interior of the pipe and comprises an elongated cylindrical member with a plurality of holes for distributing gas supplied to the center of the cylinder into contact with the inside diameter of the pipe to be heated.

BACKGROUND OF THE INVENTION

The high cost and high installation time associated with copper and other metallic tubing has in recent years prompted increased utilization of non-metallic tubing such as polyvinyl chloride (PVC) tubing, pipe, or conduit all of which is hereinafter referred to as pipe. The plastic pipe is relatively low in cost and easy to work with and has been approved for use in many applications.

When a requirement exists for a right angle or other bend in the plastic pipe, an elbow similar to the elbows utilized with metallic pipe is frequently employed. The elbow is conventionally secured to the succeeding sections of pipe by a form of adhesive. These joints, while requiring less labor than the joints associated with metallic pipe, nevertheless require considerable labor time, especially when numerous bends are to be incorporated into a pipe system. Further a system incorporating numerous joints is much more likely to produce leakage and since the joints frequently are of lower strength than the continuous piping, the chance of failure is increased.

In order to overcome the aforementioned disadvantages with respect to the provision of bends in plastic pipe, various techniques have been proposed for heating the pipe to a temperature sufficient to make it pliable and then bending the pipe around a suitable form to the angle desired. This technique has the advantage of producing joints which have approximately the same strength as the continuous pipe section and has potential for reducing the labor required for installation.

Prior art pipe heaters that have been proposed, however, are expensive, and further are of a complex construction that makes them liable to damage when used in the rugged construction environment. Further, these devices normally employ electrical heating elements which increases the cost of their operation and limits their operation to the proximity of suitable electrical outlets. Further, these devices are frequently not adaptable to varying sizes of pipe and are poorly adapted to heating of larger sizes of pipe since the large overall area results in excessive heating times.

Thus it would be advantageous if a rugged inexpensive and highly portable pipe heater could be provided, particularly if the device was adaptable to a readily available heat source and was effective for heating relatively large pipe sizes.

SUMMARY OF THE INVENTION

An exemplary embodiment of the invention comprises a heating system having an elongated heater body portion including an elongated pipe receiving opening therethrough. The device is utilized with end plates on one or both of the ends in axial alignment with the central pipe receiving chamber and also utilizes spacers on the inner diameter of the cavity to support a plastic pipe in axial alignment with the cavity. The heater body portion is of unitary construction and includes a handle at its upper surface to increase the system's portability and further includes legs on the lower surfaces of the heater body portion to maintain the device in an upright position when placed on a flat surface.

The heater body portion comprises an elongated, cylindrical member with an enlarged conical section at one end thereof. A gas inlet portion comprising an inlet conduit is located at the enlarged end plate of the heater body portion and near the outside circumference of that end plate, so as to avoid interference with the pipe receiving hole in the end plate. A flexible hose connects the exhaust outlet of an internal combustion engine to the gas inlet portion of the system. The gas entering the chamber is diffused and distributed by a baffle plate which is located adjacent the inlet portion.

A supplemental device is utilized to heat the inner diameter of a plastic pipe after it is installed within the chamber of the heater body portion. The supplemental heating device comprises a cylindrical member with a plurality of holes throughout its length. The cylindrical pipe terminates in an inlet conduit which is adapted to receive a flexible hose similar to that utilized with the main body portion. Spacers at both ends of the supplemental heating device space the hot cylindrical portion from the interior of the plastic pipe and allow the plurality of holes to distribute the quantity of hot gas from the internal combustion engine over the entire inner surface. A supplemental heating device may be used with any pipe diameter employed, by having a series of such devices of varying diameters for the different diameter pipes. However, the device is most important with respect to its heating of the interior of large diameter pipes which require excessive heating times with exterior heating only. The supplemental heating device may be utilized with the same source exhaust gas by the use of a Y to divide the exhaust gas among the two heating devices.

Thus there is produced a simple and economical pipe heating device that is portable and able to withstand rough usage and yet is effective to heat plastic pipe of a large range of diameters to a temperature sufficient to make it pliable for bending. The use of the almost universally available automobile vehicle as a heat source means that the device can be utilized at almost any conceivable job site and in addition provides an easy means for varying the heat input by merely adjusting the r.p.m. of the internal combustion engine and therefore its exhaust heat ouput.

It is therefore an object of this invention to provide a new and improved system for heating a section of pipe to a pliable temperature.

It is another object of this invention to provide a new and improved system for heating a section of pipe that is simple in construction and economical to manufacture.

It is another object of this invention to provide a new and improved pipe heating system which utilizes a readily available source of heat.

It is another object of this invention to provide a new and improved pipe heating system that it readily portable.

It is another object of this invention to provide a new and improved pipe heating system that is adaptable to a wide range of pipe sizes.

It is another object of this invention to provide a new and improved pipe heating system that provides for the heating of the interior as well as the exterior of the pipe.

It is another object of this invention to provide a new and improved pipe heating system that provides for the even distribution of heat over the entire section to be heated.

Other objects and many attendant advantages will be obvious from a reading of the following detailed description together with the drawings wherein like reference numerals designate like parts throughout and in which.

Figure 1:
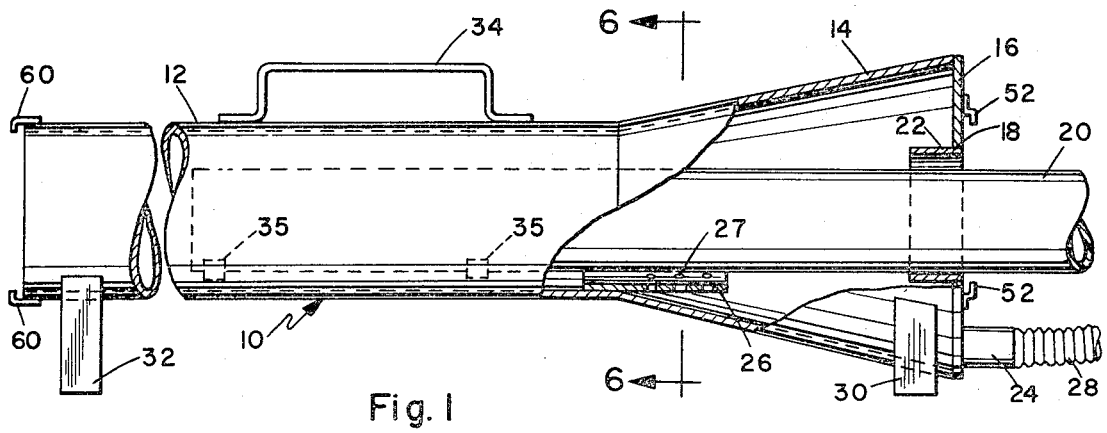
FIG. 1 is a side elevation view of the heater, partially cut away.
Figure 2:
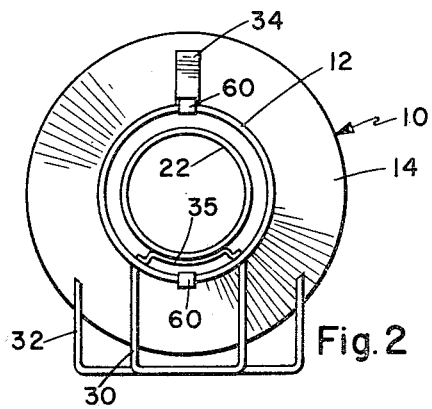
FIG. 2 is an end view as taken from the left hand end of FIG. 1.
Figure 3:
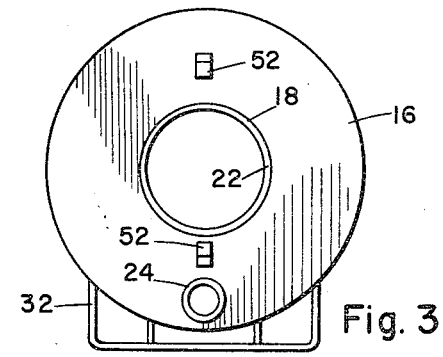
FIG. 3 is an end view as taken from the right hand end of FIG. 1.

Referring now to the figures, there is illustrated the system of the invention, including a heater body portion 10. The body portion comprises an elongated, cylindrical section 12 and a diverging conical section 14. The conical portion 14 terminates at an end plate 16 which has a central opening 18 in which is fixed a cylindrical entry section 22. The entry section is of a diameter slightly larger than the pipe size for which bending is to take place. For example, in the instant embodiment, the entry section 22 has an opening 4½ inches in diameter to accommodate a 4 inch plastic pipe 20.

The body portion has means for injecting and distributing a heated gas to the chamber within the body portion that in the instant embodiment comprises an inlet conduit 24 and baffle 26. The baffle is located adjacent the inlet portion 24 so that gas flowing into the chamber impinges on the baffle, and is deflected by it, as well as being diffused by the holes 27 provided so as to promote a thorough diffusion of the gas within the chamber and promote even heating along the chamber's length. The heated exhaust gases are supplied to the unit from an internal combustion engine, not shown, through a flexible hose 28.

The body portion is supported and held in a vertical position by legs 30 and 32 located adjacent the opposite ends of the body portion. The portability of the device is increased through the provision of a handle 34 which is located near the center of gravity of the unit so as to balance easily in the hand of a user.

Figure 4:
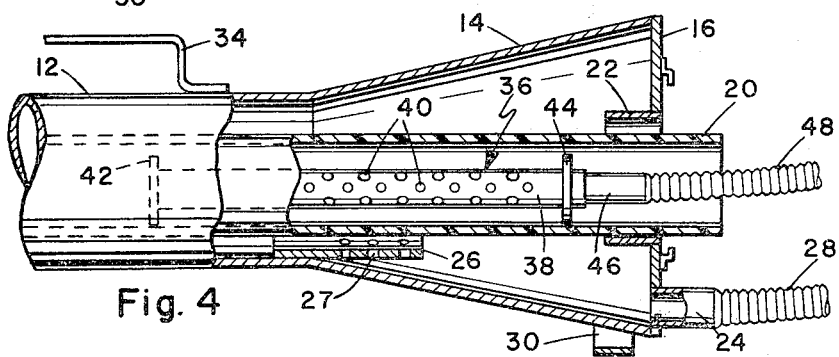
FIG. 4 is a cut away side view showing the use of an internal supplemental heater.
Figure 6:
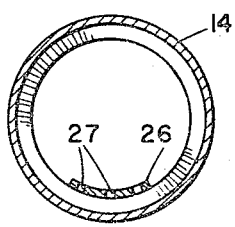
FIG. 6 is a sectional view taken on line 6—6 of FIG. 1.

A plurality of pipe supports 35 are mounted in the lower portion of the chamber to prevent the pipe from sagging into contact with the hot chamber.

Where it is desired to reduce the time necessary to heat a plastic pipe and particularly with the large pipe diameters, the supplemental heating device may be utilized, as in FIG. 4. The supplemental heating device 36 is illustrated to include a cylindrical portion 38 with a plurality of holes 40 therethrough. The cylindrical portion has a diameter considerably smaller than the inside diameter of the pipe 20 for which it is designed to be used. The spacing between the device and the inside diameter of the pipe is maintained by spacers 42 and 44, that space the cylinder from the pipe and allow the passage of gas out the exhaust end. The cylindrical member has an inlet portion 46 which is connected to a flexible hose 48. The flexible hose may be connected to the same source of exhaust gases as the flexible hose 28 for the main body portion, by utilizing a suitable Y section to divide the gases between the two devices.

In operation, the body portion is placed in proximity to the exhaust connection of an internal combustion engine and the flexible hose is connected to that exhaust connection. The internal combustion engine is then started and the temperature is allowed to stabilize. End plates are then installed on one or both ends of the body portion with the holes therethrough having been selected to be just slightly larger than the outside diameter of the pipe to be bent. The pipe to be bent is then inserted through the exhaust end of the body portion and is allowed to protrude out the inlet end as necessary to place the portion of the pipe to be bent within the chamber. With the pipe installed the hot exhaust gases will be flowing in the annulus between the outside diameter of the plastic pipe and the inside diameter of the cylindrical portion of the chamber. The prevention of hot spots is insured, and the even distribution of heat aided, by the baffle which creates a turbulent mixing flow of the exhaust gases so that all the portions of the plastic pipe are relatively evenly heated. Most of the exhaust gases continue along the length of the device and exhaust to atmosphere at the opposite end.

If additional heating is required, the supplemental device is inserted in the inside diameter of the plastic pipe, normally from the inlet end of the body portion. A Y section is inserted between the exhaust connection of the internal combustion engine and the two devices, whereby the exhaust flow is divided among the devices. The exhaust gases flow into the inside diameter of the cylinder in the supplemental device and then through the holes into the analyst formed between the outside diameter of the supplemental device cylinder and the inside diameter of the plastic pipe. These gases raise the temperature of the inside surfaces of the plastic pipe to a pliable temperature before exhausting out both ends of the pipe.

Figure 5:
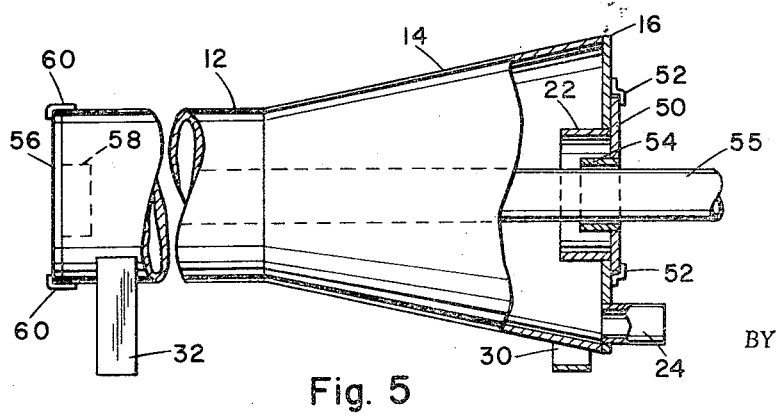
FIG. 5 is a cut away side view showing restrictor means for small pipe sizes.

When heating pipe substantially smaller in diameter than entry section 22, it may be desirable to reduce the opening to prevent undue loss of hot gases. For this, a restrictor plate 50 is held against end plate 16 by clips 52 and has a small cylindrical entry section 54 of suitable diameter for the pipe 55 to be heated, as in FIG. 5. Several different restrictor plates could be made for standard pipe sizes. Escape of hot gases can also be restricted from the exhaust end of the body by a baffle plate 56 with a cylindrical outlet section 58, the baffle plate being held by clips 60 on the body. For convenience, baffle plate 56 can be made identical to restrictor plate 50.

The temperature and quantity of the exhaust gases can be adjusted to achieve maximum heating without damage to the pipe by increasing the r.p.m. of the internal combustion engine and thereby increasing its exhaust gas output.

When the pipe is sufficiently heated it is removed from the device and bent to the desired shape through the use of a curved form.

Having described our invention, we now claim:

1. A system for heating a section of pipe to a temperature sufficient to allow bending of the pipe comprising,
   a body portion having an elongated pipe heating chamber therein,
   openings at each end of said chamber for receiving a pipe,
   means for injecting and distributing a heated gas to said chamber so as to surround substantially all of the outer surface of a pipe inserted in said chamber with said gas,
   said chamber is substantially tubular in configuration and is enlarged at one end,
   and said means for injecting and distributing a heated gas being located at said enlarged end and comprising an inlet conduit for communicating between a source of heated gas and the interior of said chamber and a baffle to diffuse said gas.

2. The system of claim 1 wherein:
   said body portion is substantially cylindrical, and said openings at each end of the chamber are circular and have a diameter smaller than the diameter of said chamber.

3. The system of claim 2 wherein: said body portion includes a plurality of legs to support the body portion in an upright position on a substantially planar surface.

4. The system of claim 2 wherein: said inlet conduit penetrates the end of said chamber adjacent said openings at said enlarged end.

5. The system of claim 1 including: a source of heated gas comprising the exhaust of an internal combustion engine.

6. The system of claim 1 further including: means for heating the interior of a pipe when said pipe is within said chamber.

7. The system of claim 6 wherein:
said means for heating the interior of said pipe comprises an elongated cylindrical member having a gas inlet portion,
and said cylindrical member having a plurality of openings along its length and having an outside diameter smaller than the inside diameter of said pipe.

8. The device of claim 7 including:
a source of heated gas comprising the exhaust of an internal combustion engine,
and said exhaust being communicated to said gas inlet portion of said means for heating the interior of said pipe and to said inlet conduit for heating the exterior of said pipe.

9. The system of claim 8 wherein: said exhaust is comunicated at at least said inlet conduit by a flexible hose.

References Cited

UNITED STATES PATENTS 2,556,116   6/1951   Smith _____ 263—2 R
3,184,796   5/1965   Southcott et al. ____ 263—2 R X CHARLES J. MYHRE, Primary Examiner U.S. Cl. X.R.
126—271.1